No. 652,602. Patented June 26, 1900.
R. D. EARLE.
GRASS OR CORN CUTTING HOOK.
(Application filed Aug. 18, 1899.)
(No Model.)

Witnesses:
J. W. Garfield
H. D. Clemons

Inventor,
Rogette D. Earle
by Chapin
Attorneys.

THE NORRIS PETERS CO., PHOTO-LITHO., WASHINGTON, D. C.

UNITED STATES PATENT OFFICE.

ROGETTE D. EARLE, OF CHICOPEE FALLS, MASSACHUSETTS, ASSIGNOR TO CHARLES W. TILDEN, OF HALLOWELL, MAINE.

GRASS OR CORN CUTTING HOOK.

SPECIFICATION forming part of Letters Patent No. 652,602, dated June 26, 1900.

Application filed August 18, 1899. Serial No. 727,630. (No model.)

*To all whom it may concern:*

Be it known that I, ROGETTE D. EARLE, a citizen of the United States of America, residing at Chicopee Falls, in the county of Hampden and State of Massachusetts, have invented new and useful Improvements in Grass or Corn Cutting Hooks, of which the following is a specification.

This invention relates to hand implements for cutting grass, corn, and similar agricultural products, the object being to provide an improved grass and corn hook or cutter for hand use; and the invention consists in the peculiar construction of that part of the blade of the implement to which the handle thereof is connected and the part of said handle which is applied to the blade, whereby the handle is maintained normally in an inclined position relative to the plane of the upper side of the blade, all as hereinafter fully described, and more particularly pointed out in the claims.

Figure 1:
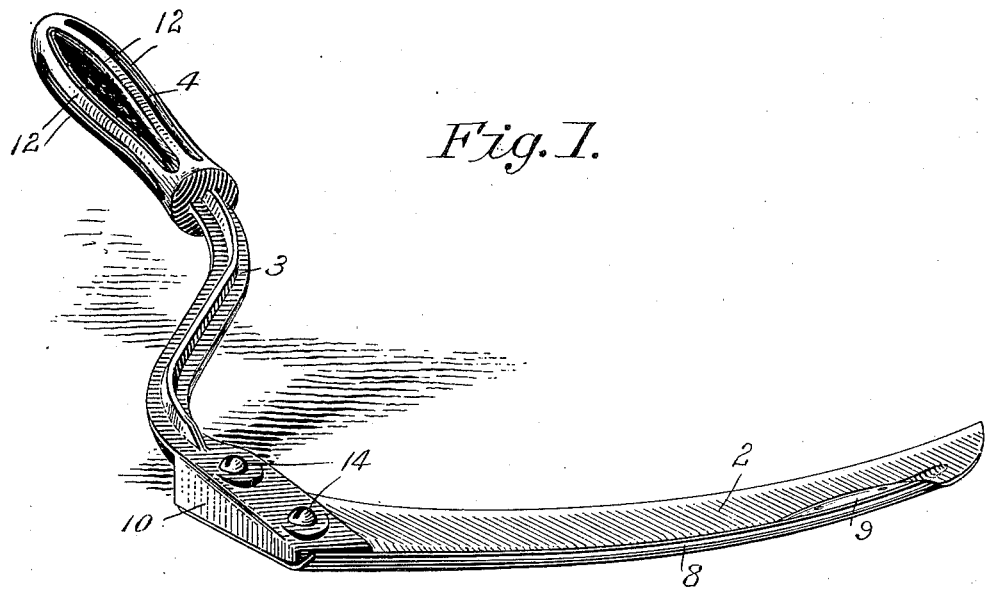
Figure 2:
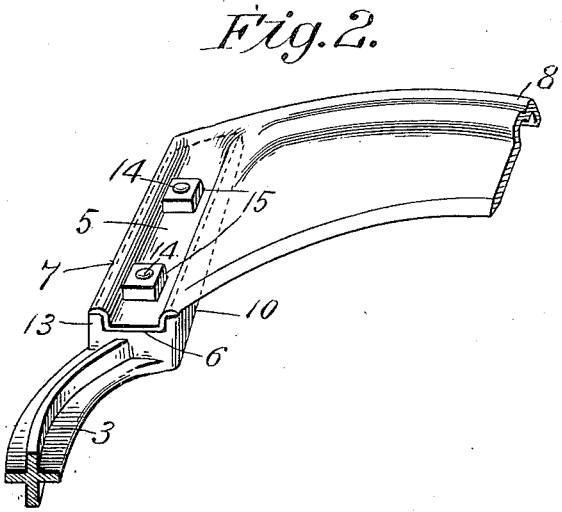

In the drawings forming part of this specification, Figure 1 is a perspective view of a grass and corn hook constructed according to my invention. Fig. 2 is a perspective view of the parts of the blade and of the handle-bar of the hook near their point of union one with the other.

Referring to the drawings, 2 indicates the blade of the implement, 3 the handle-bar, and 4 the handle proper. Said blade 2 is constructed from steel and has the general form illustrated in Fig. 1, and has in its wider end, or that which is attached to the handle-bar 3, a groove 5, the formation of which groove produces on the opposite side of the end of the blade a rib 6, and on the border of said rib, across the blade, is formed a lip 7 of hook shape in cross-section, as shown in Fig. 2. A similar rib 8 is formed on the outer border of the blade, as shown in Fig. 2, and serves as a strengthening element to the blade.

Cutting utensils of the class herein described and made for the use herein referred to are ordinarily more or less inconvenient for use owing to the lightness of the free end or point of the blade and its inclination to take a higher position than is intended by the user when swung against the matter which is to be cut, and these conditions are more pronounced when the construction of the hook is such as herein shown relative to the extension of the handle thereof upwardly in an inclined plane relative to the side of the blade, and to remedy the said inconvenience and to impart to the point of the blade a tendency to swing downwardly while cutting, whereby the blade is brought to the best position for successful operation, a metal block or weight 9 is secured on the side of the blade, near the point thereof, as shown in Fig. 1, said block having such weight as is most agreeable to the user of the hook.

The handle-bar 3 of the hook is made, preferably, of the form shown in the drawings, comprising four ribs, as shown in section in said last-named figure, extending at right angles from a common center. Said handle-bar has on its extremity, to which the blade 2 is attached, a projection 10 of block-like form on one side thereof, which projection has a face of a suitable angle relative to the handle-bar, which when the blade is secured against said block, as shown in Fig. 1, brings the handle-bar and handle and the upper side of the blade to the respective differing angles heretofore referred to—that is to say, in Fig. 1 the blade 2 is represented as resting in a level plane, and the handle-bar is there illustrated as extending at an angle of incline upwardly from the side of the blade. The handle 4 of the handle-bar is preferably constructed from metal and cast integrally with the handle-bar and has an exterior shell consisting of a series of longitudinally-separated ribs 12, extending from end to end thereof and leaving the handle hollow, thus constituting a bearing for the hand upon the handle of such character that the grip of the hand thereon is easily maintained and undue perspiration between the hand and the handle is obviated. Said projection 10 of the handle-bar, to which the end of the blade is attached, has a groove therein having the form of the said rib 6 on the under side of the wide end of said blade, and a narrow rib 13 is provided on the outer border of said projection 10. Thus when the blade and handle are secured one upon the other by bolts and nuts 14 and 15, as shown in Fig. 2, the said rib 6 of the blade is rigidly engaged in said groove in the handle projection 10, and the said narrow rib 13 is engaged by the said hook-shaped lip 7 on the end of the blade, and therefore the handle and blade must maintain under all conditions of use the relative positions illustrated in the drawings.

Having thus described my invention, what I claim, and desire to secure by Letters Patent of the United States, is—

1. In a hook for cutting grass, corn, and like substances, comprising a blade having a projecting rib extending transversely across its widest end, and a hook-shaped lip parallel with said rib, combined with a handle-bar having a block-like projection on the end thereof to be attached to said blade, said projection having on one side thereof a groove to receive said blade-rib, and a rib for engagement in said hook-shaped lip, and means for rigidly uniting said blade and handle-bar, substantially as described.

2. In a hook for cutting grass, corn, and like substances, comprising a blade having the projecting rib 6 across one end thereof, and the lip 7 of hook shape in cross-section parallel with said rib, combined with a handle-bar for said blade having the inclined block-like projection 10, in which is a groove to receive said blade-rib, and a rib 13, which is engaged by said lip 7, and suitable means for securing said blade to the handle-bar, whereby said parts thereof are rigidly united in operative positions, substantially as described.

ROGETTE D. EARLE.

Witnesses:
H. A. CHAPIN,
K. I. CLEMONS.